(No Model.)
F. B. COCHRAN.
ICE CREAM FREEZER.
No. 448,935. Patented Mar. 24, 1891.
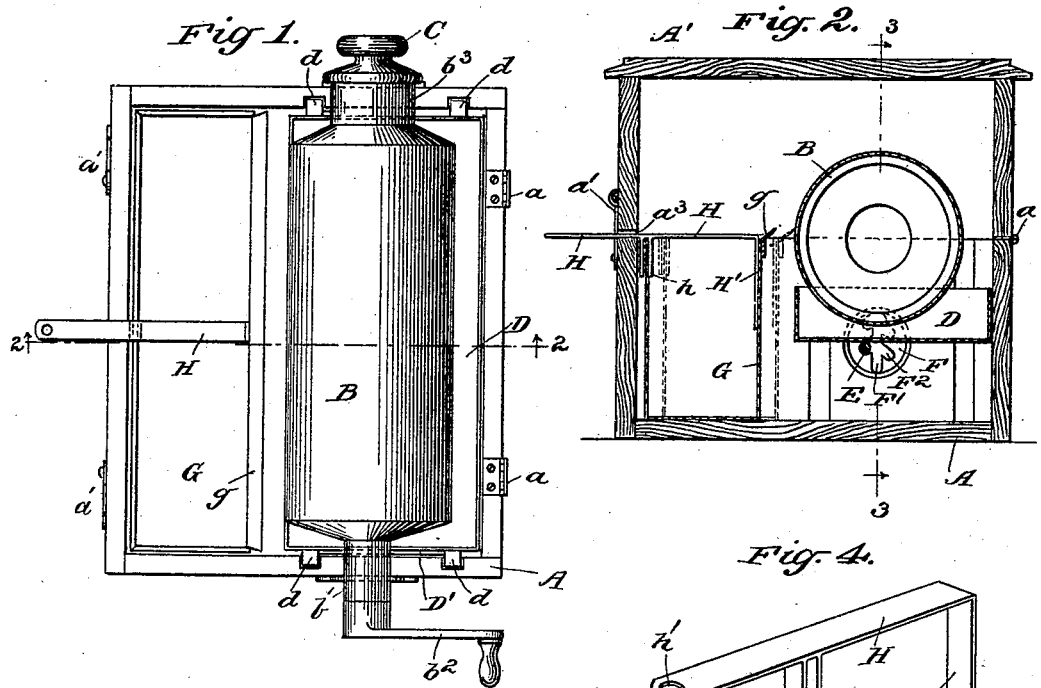
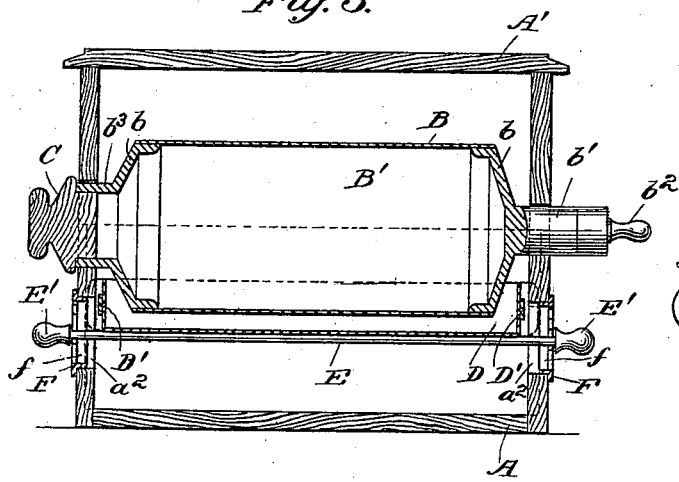
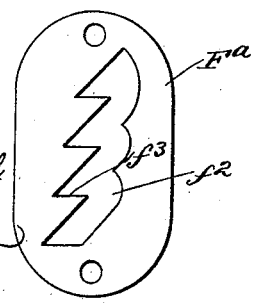
WITNESSES:
J. A. Criswell
C. Sedgwick
INVENTOR:
F. B. Cochran
BY Munn & Co.
ATTORNEYS
THE NORRIS PETERS CO., PHOTO-LITHO., WASHINGTON, D. C.

ously rectangular and which has a
UNITED STATES PATENT OFFICE.

FREDERIC B. COCHRAN, OF NEW YORK, N. Y.

ICE-CREAM FREEZER.

SPECIFICATION forming part of Letters Patent No. 448,935, dated March 24, 1891.

Application filed December 18, 1890. Serial No. 375,086. (No model.)

*To all whom it may concern:*

Be it known that I, FREDERIC B. COCHRAN, of New York city, in the county and State of New York, have invented a new and Improved Ice-Cream Freezer, of which the following is a full, clear, and exact description.

My invention relates to improvements in ice-cream freezers; and the object of my invention is to produce a low-cost machine of simple construction in which the various kinds of ices may be frozen quickly and kept frozen a long time, and also to provide means for preventing any of the material used in freezing from getting into the material which is frozen.

To this end my invention consists in certain features of construction and combinations of parts, which will be hereinafter fully described, and then pointed out in the claims.

Reference is to be had to the accompanying drawings, forming a part of this specification, in which similar letters of reference indicate corresponding parts in all the figures.

Figure 1 is a plan view of the freezer with the top removed. Fig. 2 is a cross-section on the line 2 2 of Fig. 1. Fig. 3 is a longitudinal section on the line 3 3 of Fig. 2. Fig. 4 is a detail perspective view of the handle used for operating the receptacle which receives the frozen cream. Fig. 5 is a detail front elevation of the slotted plate which holds the cream-pan-supporting rod, and Figs. 6 and 7 are front elevations of modifications of the plate.

The freezer is provided with a case A, which is preferably rectangular and which has a suitable top A', the top being hinged on one side, as shown at $a$, and fastened on the other side with suitable latches $a'$, and mounted longitudinally in the case near the back side is a cylinder B, which contains the ice and salt or other material used in freezing the cream.

The cylinder B consists of a central portion B', made of flexible sheet metal, and two end castings $b$, which are secured to the central or body portion, one of the castings terminating in a central hub or trunnion $b'$, which is mounted in one end of the case and terminates in a crank-handle $b^2$, and the opposite casting $b$ terminates in the center in a nozzle $b^3$, which also turns in a bearing in the case and is closed by a removable plug C. The cylinder B may be lifted from the case by removing the top A', and by removing the plug C from the cylinder it may be easily filled with the desired freezing compound, or it may be as quickly emptied.

Beneath the cylinder B is a cream-pan D, which is suspended in relation to the cylinder so that the lower portion of the cylinder will project into it, and the pan has on each end a plate D', provided with lugs $d$, which project into recesses in the ends of the case A, and which thus prevent the pan from tipping. The pan is supported by a rod E, which extends centrally beneath it and through recesses $a^2$ in the opposite ends of the case, the rods terminating in suitable handles or knobs E', by means of which it may be operated, and the rod also projects through slots in the plates F, which are secured in the recesses $a^2$ of the case. The plate F has an annular flange $f$ on the inner side, which fits closely in the opening $a^2$, and it is obvious that if the recess or opening should be of a form other than round the flange would not be annular, but would be made to fit the recess. The plate F has perforated ears $f'$ on opposite sides, by means of which it may be secured to the case A, and a slot F' extends vertically through each plate, the slot having on each side branch slots F², which are arranged at different heights and which are adapted to receive and support the rod E. It will thus be seen that by grasping the handles of the rod the rod and pan may be raised or lowered, and the rod will be held in the branch slots or recesses F² of the plate, so that the cream-pan D may be held at any desired distance from the cylinder, which distance will be regulated according to the amount of cream contained in the pan.

In Figs. 6 and 7 I have shown modified forms of the plates for supporting the rod E, the plate Fᵃ being perforated at the ends, so that it may be secured to the case, and having a vertical slot $f^2$, with a series of horizontal shelves $f^3$ placed one above the other and adapted to support the rod, and the plate Fᵇ is substantially like the plate Fᵃ, it having a slot in the central portion, as shown;

but the shelves $f^4$, which are produced on one side of the slot in the plate are concaved instead of being horizontal. In both the plates $F^a$ and $F^b$ the part of the main slot opposite the shelves is curved outward, so that the rod E, which projects through the slot may be easily placed on or removed from any particular shelf.

In front of the cylinder B is a receptacle G, which extends the entire length of the case A and rests on the bottom thereof, and the top of which is on a level with the central portion of the cylinder, and on the front edge of the receptacle G is a lip $g$, which terminates in an edge and which extends diagonally upward, so that when the receptacle is moved against the cylinder the lip $g$ will scrape against the sides of the cylinder, and any cream which is frozen upon and adheres to the cylinder will be thereby scraped off and will fall into the receptacle G.

The receptacle G is moved back and forth by means of a handle H, which extends outward through a slot $a^3$ in the front of the case, the said handle having depending parallel strips $h$ on the under side, which are adapted to embrace the front edge of the receptacle G, and the inner end of the handle is bent at an angle and extends downward, as shown at H', the bent portion being such a distance from the strips $h$ that it will press against the back portion of the receptacle. The outer end of the handle H is provided with a hole $h'$, through which the fingers may be inserted, in order that the handle may be more easily operated.

The freezer is operated as follows: The cream or other material to be frozen is placed in the pan D. The cylinder B is filled with a suitable freezing compound and placed in position in the case. The pan D is adjusted in relation to the cylinder by means of the rod E and plates F, as described. The top A' of the case is closed down upon the lower portion of the case, and the cylinder is then revolved by means of the crank-handle $b^2$. Owing to the material within the cylinder, the wall will be extremely cold and the cream will freeze and adhere to the wall as soon as it is touched by the same, and as the cylinder is revolved a thick coating of the cream or other material will be frozen upon the cylinder.

The cylinder may be removed bodily from the case with the cream frozen thereon, or the receptacle G may be pushed inward against the cylinder by means of the handle $h$ while the cylinder is being revolved, and the ice will be scraped from the cylinder into the receptacle G, which may be removed when the desired amount has been frozen.

Having thus described my invention, I claim as new and desire to secure by Letters Patent—

1. In an ice-cream freezer, the combination, with the case and the revolving cylinder, of a cream-pan mounted beneath the cylinder, slotted plates secured in opposite ends of the case and provided with a series of shelves of different heights, and a supporting-rod extending beneath the pan and through the slotted plates, substantially as described.

2. In an ice-cream freezer, the combination, with the case and the vertically-adjustable rod extending through the case, of a pan mounted on the rod and provided with projecting lugs to enter recesses of the case, substantially as described.

3. In an ice-cream freezer, the combination, with the revoluble cylinder and the sliding receptacle arranged at one side of the cylinder, of a handle having depending strips to engage one side of the receptacle and a bent end to press against the opposite side thereof, substantially as described.

4. In an ice-cream freezer, the combination, with the case, the revoluble cylinder mounted therein, and the sliding receptacle at one side of the cylinder, of the handle extending through a slot in the case and shaped to clasp one side and press against the opposite side of the receptacle, substantially as described.

FREDERIC B. COCHRAN.

Witnesses:
WARREN B. HUTCHINSON,
EDWD. M. CLARK.